US008056404B2

(12) United States Patent
Murase

(10) Patent No.: US 8,056,404 B2
(45) Date of Patent: Nov. 15, 2011

(54) OUTPUT CALIBRATION APPARATUS AND OUTPUT CALIBRATION METHOD FOR NOX SENSOR

(75) Inventor: Nao Murase, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 35 days.

(21) Appl. No.: 12/674,095

(22) PCT Filed: Sep. 18, 2009

(86) PCT No.: PCT/JP2009/004738

§ 371 (c)(1),
(2), (4) Date: Feb. 18, 2010

(87) PCT Pub. No.: WO2010/032481

PCT Pub. Date: Mar. 25, 2010

(65) Prior Publication Data

US 2011/0138874 A1 Jun. 16, 2011

(30) Foreign Application Priority Data

Sep. 18, 2008 (JP) ................................ 2008-239822

(51) Int. Cl.
*G01M 15/00* (2006.01)

(52) U.S. Cl. ................................ 73/114.69; 73/114.71

(58) Field of Classification Search ............... 73/114.69, 73/114.71
See application file for complete search history.

(56) References Cited

U.S. PATENT DOCUMENTS

| | | | | |
|---|---|---|---|---|
| 6,375,828 | B2 * | 4/2002 | Ando et al. | 205/781 |
| 6,901,745 | B2 * | 6/2005 | Schnaibel et al. | 60/285 |
| 7,617,672 | B2 * | 11/2009 | Nishina et al. | 60/277 |
| 7,842,267 | B2 * | 11/2010 | Nishina et al. | 423/237 |
| 7,921,706 | B2 * | 4/2011 | Sumitani | 73/114.69 |
| 2002/0017467 | A1 | 2/2002 | Ando et al. | |
| 2002/0130053 | A1 * | 9/2002 | Ando et al. | 205/781 |
| 2003/0167754 | A1 * | 9/2003 | Schnaibel et al. | 60/286 |
| 2008/0295489 | A1 * | 12/2008 | Elfvik | 60/277 |

(Continued)

FOREIGN PATENT DOCUMENTS

JP 11-148910 A 6/1999

(Continued)

OTHER PUBLICATIONS

JP Office Action for corresponding Japanese Patent Application No. 2008-239822 mailed Jun. 22, 2010.

(Continued)

*Primary Examiner* — Freddie Kirkland, III
(74) *Attorney, Agent, or Firm* — Sughrue Mion, PLLC

(57) ABSTRACT

An output calibration apparatus for an NOx sensor according to the present invention includes a urea addition valve provided in an exhaust passage in an internal combustion engine to allow urea to be added to inside of the exhaust passage, and an NOx sensor provided at least downstream of the urea addition valve, the NOx sensor being capable of detecting not only an NOx concentration but also an ammonia concentration. The output calibration apparatus executes fuel cut on the internal combustion engine, and calibrates a gain of the NOx sensor based on ammonia obtained from the urea added via the urea addition valve during execution of the fuel cut. The ammonia obtained from the urea added during execution of the fuel cut is used as standard gas to calibrate the gain of the NOx sensor.

6 Claims, 8 Drawing Sheets

U.S. PATENT DOCUMENTS

| | | | | |
|---|---|---|---|---|
| 2009/0277160 | A1* | 11/2009 | Katoh et al. | 60/286 |
| 2010/0115918 | A1* | 5/2010 | Sawada et al. | 60/276 |
| 2010/0199636 | A1* | 8/2010 | Goya et al. | 60/276 |
| 2010/0319316 | A1* | 12/2010 | Kasahara | 60/273 |

FOREIGN PATENT DOCUMENTS

| | | | |
|---|---|---|---|
| JP | 11-237363 | A | 8/1999 |
| JP | 2002-273176 | A | 9/2002 |
| JP | 2002-539448 | A | 11/2002 |
| JP | 2004-011492 | A | 1/2004 |
| JP | 2006-342771 | A | 12/2006 |
| JP | 2007-051924 | A | 3/2007 |
| JP | 2008-175173 | A | 7/2008 |

OTHER PUBLICATIONS

International Search Report dated Mar. 31, 2011, corresponding to PCT/JP2009/004738.

* cited by examiner

OUTPUT CALIBRATION APPARATUS AND OUTPUT CALIBRATION METHOD FOR NOX SENSOR

TECHNICAL FIELD

The present invention relates to an output calibration apparatus and an output calibration method for an NOx sensor, and in particular, to an apparatus and a method suitable for calibrating the gain of an NOx sensor provided in an exhaust passage in an internal combustion engine.

BACKGROUND ART

In general, an NOx catalyst configured to clean NOx (nitrogen oxide) contained in exhaust gas is known as an exhaust purifying apparatus located in an exhaust system in an internal combustion engine such as a diesel engine. Various types of NOx catalysts are known. In particular, an NOx catalyst of selective reduction type is well known which continuously reduces and removes NOx by addition of a reducing agent. The reducing agent is commonly used in the form of an aqueous solution of urea. The aqueous solution of urea is ejected and fed from the upstream side of the catalyst. Then, the aqueous solution of urea receives heat from the exhaust and the catalyst and is thus hydrolyzed to generate ammonia. The ammonia reacts with NOx on the NOx catalyst. As a result, NOx is decomposed into $N_2$ and $H_2O$. Such a system configured to continuously reduce and remove NOx by means of the NOx catalyst of selective reduction type using added urea as a reducing agent is called a urea SCR system.

On the other hand, in order to control the amount of reducing agent for example, an NOx sensor is installed downstream of the NOx catalyst to detect the concentration of NOx. The NOx sensor outputs a signal of a magnitude corresponding to the detected NOx concentration. However, temporal changes or the like may cause the output value to deviate gradually from the one obtained when the sensor is new. The deviation may occur particularly in both an offset that is a sensor output value obtained when the NOx concentration is zero and a gain indicative of the degree of an increase in sensor output value which is consistent with the NOx concentration. Hence, the offset and the gain are preferably calibrated at appropriate timings, in order to allow the NOx concentration to be accurately detected even with a deviation in sensor output.

For example, Patent Document 1 discloses that since NOx is not present in the exhaust gas during fuel cut while the supply of fuel to the internal combustion engine is stopped, a reference point for the NOx sensor is learned during the fuel cut.

However, no technique suitable for calibrating the gain of the NOx sensor has been developed, and appropriate measures have been expected to be urgently developed.

Under these circumstances, the present inventors have focused on the NOx sensor's capability of detecting not only the NOx concentration but also an ammonia concentration. The present inventors thus have newly developed a technique to calibrate the gain of the NOx sensor utilizing ammonia obtained from added urea.

The present invention has been made in view of the above-described circumstances. An object of the present invention is to provide an output calibration apparatus and an output calibration method for an NOx sensor which enable the gain of the NOx sensor to be suitably calibrated.

CITATION LIST

Patent Literature

Patent Document: 1 Japanese Patent Application Laid-Open No. 2004-11492

SUMMARY OF INVENTION

An aspect of the present invention provides an output calibration apparatus for an NOx sensor characterized by comprising:

a urea addition valve provided in an exhaust passage in an internal combustion engine to allow urea to be added to inside of the exhaust passage;

an NOx sensor provided at least downstream of the urea addition valve, the NOx sensor being capable of detecting not only an NOx concentration but also an ammonia concentration;

fuel cut means for executing fuel cut on the internal combustion engine; and calibration means for calibrating a gain of the NOx sensor based on ammonia obtained from the urea added via the urea addition valve during execution of the fuel cut.

When the urea is added via the urea addition valve during execution of the fuel cut, exhaust gas supplied to the NOx sensor contains no NOx but only ammonia obtained from the added urea. On the other hand, the concentration of the ammonia can be detected by the NOx sensor. Thus, the ammonia obtained from the added urea can be utilized to suitably calibrate the gain of the NOx sensor.

Preferably, the calibration means calibrates the gain of the NOx sensor based on the relationship between an output from the Nox sensor and the ammonia concentration obtained when an amount of urea equivalent to a predetermined ammonia concentration is added via the urea addition valve during execution of the fuel cut.

Thus, the gain of the NOx sensor can be suitably calibrated using ammonia gas of a known concentration as standard gas or span gas.

Preferably, the calibration means calibrates an offset of the NOx sensor before execution of the gain calibration and during execution of the fuel cut.

Thus, the offset can be suitably calibrated, and the gain is calibrated with a reference point or a zero point accurately set. Consequently, the gain can be more accurately calibrated.

Preferably, the calibration means calibrates the gain for each of a plurality of divided regions of the ammonia concentration or the NOx concentration.

In particular, a growing demand for an emission reduction has recently led to a demand for an increase in the accuracy of detection of NOx in a low NOx-concentration region. Then, calibrating the gain for each of the plurality of divided regions allows the gain to be accurately obtained for each region. This enables a drastic improvement in the accuracy with which NOx is detected in each region, particularly in the low-concentration region.

Preferably, the output calibration apparatus further comprises an NOx sensor (upstream NOx sensor) provided upstream of the urea addition valve, and at least after execution of the calibration of the gain of the NOx sensor (downstream NOx sensor) provided downstream of the urea addition valve and during non-execution of the fuel cut and urea addition, the calibration means calibrates a gain of the upstream NOx sensor by comparing an output from the upstream NOx sensor with an output from the downstream NOx sensor.

At least after execution of the calibration of the gain of the downstream NOx sensor, the correlation between the output from the downstream NOx sensor and the NOx concentration is accurate. Furthermore, during non-execution of the fuel cut, NOx is present in exhaust gas. During non-execution of the urea addition, the possible adverse effects of ammonia resulting from the urea are inhibited. Hence, exhaust gas of the same NOx concentration can be supplied to the upstream NOx sensor and the downstream NOx sensor. Consequently, the gain of the upstream NOx sensor can be suitably calibrated by comparing the outputs from the two sensors with each other.

Another aspect of the present invention provides a method for calibrating an output from an NOx sensor provided in an internal combustion engine, the internal combustion engine including a urea addition valve provided in an exhaust passage in the internal combustion engine to allow urea to be added to the exhaust passage, the NOx sensor being provided at least downstream of the urea addition valve and being capable of detecting not only an NOx concentration but also an ammonia concentration, the output calibration method for the NOx sensor comprising:

a step of executing fuel cut on the internal combustion engine;

a step of adding urea via the urea addition valve during execution of the fuel cut; and a step of calibrating a gain of the NOx sensor based on ammonia obtained from the added urea.

The present invention is very effective for suitably calibrating the gain of the Nox sensor.

DESCRIPTION OF EMBODIMENTS

The best mode for carrying out the present invention will be described below with reference to the drawings.

Figure 1:
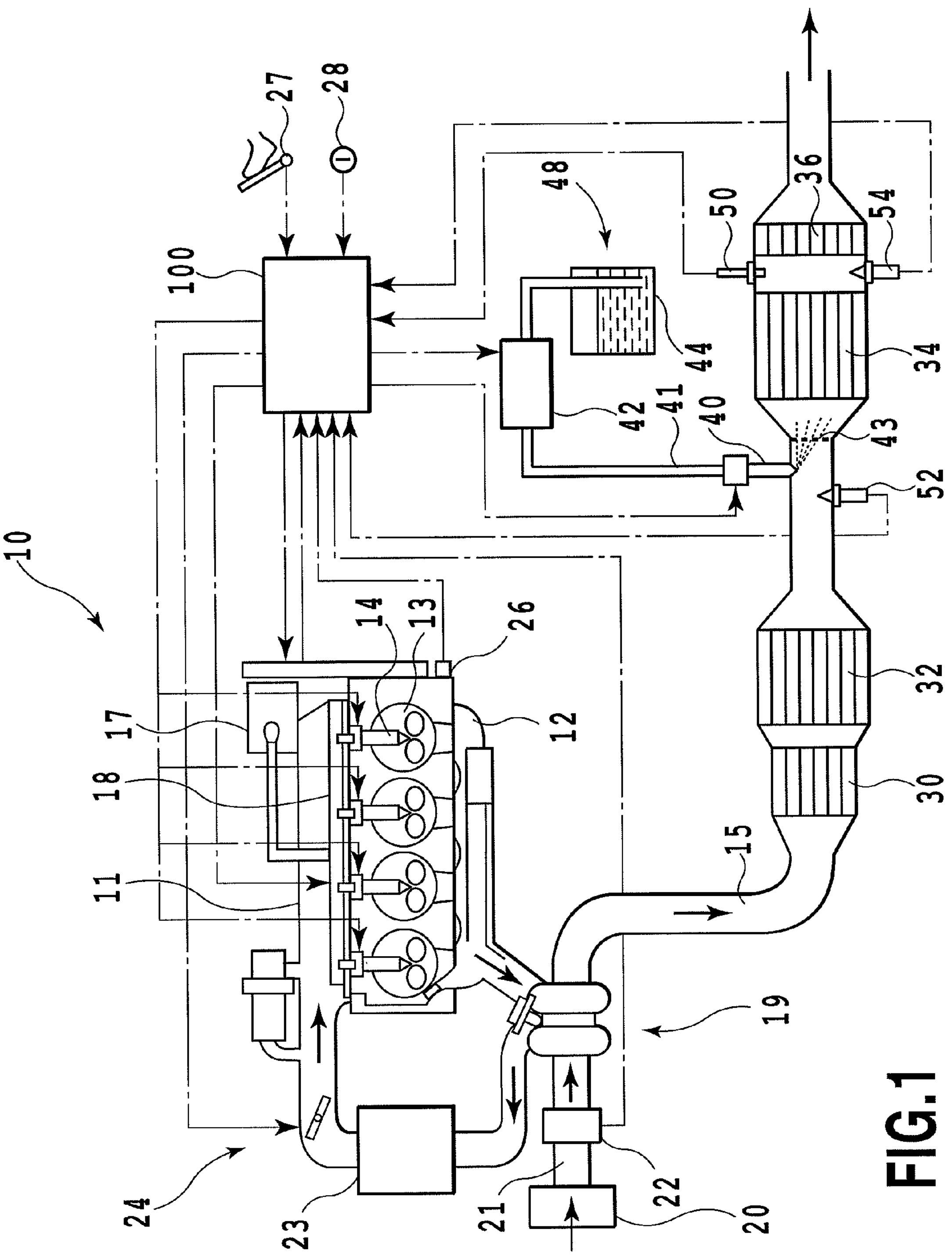
FIG. 1 is a schematic diagram of the system of an internal combustion engine according to an embodiment of the present invention.

FIG. 1 is a schematic diagram of the system of an internal combustion engine according to an embodiment of the present invention. In FIG. 1, reference numeral 10 denotes a compression ignition internal combustion engine for automobiles, that is, a diesel engine. Reference numeral 11 denotes an intake manifold that is in communication with an intake port. Reference numeral 12 denotes an exhaust manifold that is in communication with an exhaust port. Reference numeral 13 denotes a combustion chamber. In the present embodiment, fuel from a fuel tank (not shown in the drawings) is supplied to a high-pressure pump 17. The high-pressure pump 17 then pumps the fuel to a common rail 18, in which the fuel is accumulated at a high pressure. The high-pressure fuel in the common rail 18 is injected and fed into the combustion chamber 13 through an injector 14. Exhaust gas from the engine flows from the exhaust manifold 12 through a turbocharger 19 to a downstream exhaust passage 15, where the exhaust gas is purified as described below. The purified exhaust gas is then discharged to the air. The aspect of the diesel engine is not limited to the one comprising such a common rail type fuel injection system but may optionally include another exhaust purification device such as an ERG apparatus.

On the other hand, intake air is introduced into an intake passage 21 through an air cleaner 20. The intake air flows through an air flow meter 22, a turbocharger 19, an intercooler 23, and a throttle valve 24 in this order to an intake manifold 11. The air flow meter 22 is a sensor configured to detect the amount of intake air. Specifically, the air flow meter 22 outputs a signal corresponding to the flow rate of the intake air. The throttle valve 24 adopted is electronically controlled.

In the exhaust passage 15, the following are arranged in series in the following order from the upstream side: an oxidation catalyst 30 configured to oxidize and purify an unburned component (particularly HC) in exhaust gas, a DPR (Diesel Particulate Reduction) catalyst 32 configured to collect, burn, and remove particulate matter (PM) in the exhaust gas, an NOx catalyst particularly of selective reduction type 34 configured to reduce and purify NOx in the exhaust gas, and an ammonia oxidation catalyst 36.

A urea addition apparatus 48 is provided to add urea to the NOx catalyst 34 as a reducing agent. Specifically, a urea addition valve 40 configured to add or inject urea (more specifically, an aqueous solution of urea) is provided in a part of the exhaust passage 15 which is located downstream of the DPR catalyst 32 and upstream of the NOx catalyst 34. The urea addition valve 40 is supplied with an aqueous solution of urea by a urea supply pump 42 through a supply line 41. The urea supply pump 42 sucks and ejects the aqueous solution of urea stored in the urea tank 44. To allow the aqueous solution of urea injected via the urea addition valve 40 to be evenly supplied to the NOx catalyst 34, a dispersion plate 43 is provided between the urea addition valve 40 and the NOx catalyst 34.

Furthermore, an electronic control unit (hereinafter referred to as an ECU) 100 is provided which serves as control means for controlling the whole engine. The ECU 100 includes a CPU, a ROM, a RAM, an I/O port, and a storage device. The ECU 100 controls the injector 14, the high-pressure pump 17, the throttle valve 24, and the like based on, for example, detection values from various sensors so as to allow desired engine control to be performed. Additionally, the ECU 100 controls the urea addition valve 40 and the urea supply pump 42 so as to control the amount of urea added. The sensors connected to the ECU 100 include the above-described air flow meter 22, an NOx sensor provided downstream of the NOx catalyst 34, that is, a downstream NOx sensor 50, and a pre-catalyst exhaust temperature sensor 52 and a post-catalyst exhaust temperature sensor 54 provided upstream and downstream, respectively, of the NOx catalyst 34. The downstream NOx sensor 50 is installed between the NOx catalyst 34 and the ammonia oxidation catalyst 36. The pre-catalyst exhaust temperature sensor 52 is installed between the DPR catalyst 32 and the NOx catalyst 34.

The other sensors connected to the ECU 100 include a crank angle sensor 26, an accelerator opening sensor 27, and an engine switch 28. The crank angle sensor 26 outputs a crank pulse signal to the ECU 100 during rotation of the crank angle. Based on the crank pulse signal, the ECU 100 detects the crank angle of the engine 10 and calculates the rotation speed of the engine 10. The accelerator opening sensor 27 outputs, to the ECU 100, a signal corresponding to the opening (accelerator opening) of an accelerator pedal operated by a user. The engine switch 28 is turned on by the user to start the engine and turned off by the user to stop the engine.

The downstream NOx sensor 50 provides an output signal of a magnitude proportional to the NOx concentration and ammonia concentration of exhaust gas. In particular, the downstream NOx sensor 50 can detect not only NOx but also ammonia ($NH_3$) in the exhaust gas. The downstream NOx sensor 50 is what is called a limiting current NOx sensor. The downstream NOx sensor 50 internally decomposes the NOx (particularly NO) in the exhaust gas into $N_2$ and $O_2$. Then, on the basis of migration of oxygen ions between electrodes based on $O_2$, the downstream NOx sensor 50 generates a current output. On the other hand, the downstream NOx sensor 50 internally decomposes $NH_3$ in the exhaust gas into NO and $H_2O$ and further decomposes NO into $N_2$ and $O_2$. The downstream NOx sensor 50 then generates a current output in accordance with a principle similar to that for NOx. The downstream NOx sensor 50 provides an output proportional to the total of the NOx concentration and the ammonia concentration. The downstream NOx sensor 50 cannot provide different outputs for the NOx concentration and the ammonia concentration.

For example, the NOx catalyst of selective reduction type (SCR: Selective Catalytic Reduction) 34 carries rare metal such as Pt on the surface of a base material such as zeolite or alumina or carries transition metal such as Cu on the surface of the base material through ion exchange or carries a titania/vanadium catalyst ($V_2O_5/WO_3/TiO_2$). The NOx catalyst of selective reduction type 34 has a catalyst temperature within an active temperature region. When urea is added to the NOx catalyst of selective reduction type 34 as a reducing agent, the NOx catalyst of selective reduction type 34 reduces and cleans NOx. When urea is added to the catalyst, ammonia is generated on the catalyst. The ammonia reacts with and reduces NOx. This reaction is expressed by the following formula:

$$NO+NO_2+2NH_3 \rightarrow 2N_2+3H_2O$$

The temperature of the NOx catalyst 34 can be detected directly by a temperature sensor embedded in the catalyst. However, according to the present embodiment, the temperature is estimated. Specifically, the ECU 100 estimates the catalyst temperature based on a pre-catalyst exhaust temperature and a post-catalyst exhaust temperature detected by the pre-catalyst exhaust temperature sensor 52 and the post-catalyst exhaust temperature sensor 54, respectively. The estimation method is not limited to such an example.

The amount of urea added to the NOx catalyst 34 is controlled based on the NOx concentration detected by the downstream NOx sensor 50. Specifically, the amount of urea injected via the urea addition valve 40 is controlled so as to always maintain the detection value of the NOx concentration at zero. In this case, the urea injection amount may be set based only on the detection value of the NOx concentration. Alternatively, such a basic urea injection amount as zeroes the NOx concentration may be set based on an engine operation state (for example, an engine rotation speed and an accelerator opening) and corrected in a feedback manner based on a detection value from the downstream NOx sensor 50. The NOx catalyst 34 can reduce NOx only upon receiving added urea. Thus, urea is constantly added. Furthermore, control is performed such that only a minimum amount of urea required for NOx reduction is added. Addition of an excessive amount of urea may cause ammonia to be discharged downstream of the catalyst (this is what is called $NH_3$ strip), resulting in abnormal odor or the like.

Here, the minimum amount of urea required to reduce the total amount of NOx discharged from the engine is defined as A. The amount of urea actually added is defined as B. Then, the ratio B/A is called an equivalence ratio. The urea addition control is performed so as to make the equivalence ratio as close to one as possible. However, the operation state of the engine varies momentarily. Hence, the actual equivalence ratio is not always one. An equivalence ratio of smaller than one results in an insufficient urea supply amount, and NOx is discharged downstream of the catalyst. This is sensed by the downstream NOx sensor 50 to allow the urea supply amount to be increased. An equivalence ratio of larger than results in an excessive urea supply amount, and ammonia leaks downstream of the NOx catalyst 34. However, the ammonia is removed by the ammonia oxidation catalyst 36 and thus prevented from being discharged to the exterior. The added urea may be absorbed by and attached to the NOx catalyst 34. In this case, even when the addition of urea is stopped, the attached urea allows the NOx to be reduced for a while.

The execution and stoppage of the urea addition are controlled depending on the catalyst temperature (in the present embodiment, an estimated value) of the NOx catalyst 34. Specifically, the urea addition is executed when the catalyst temperature is at least a predetermined minimum active temperature (for example, 200° C.) and is stopped when the catalyst temperature is lower than the minimum active temperature. This is because NOx cannot be efficiently reduced even with the urea addition before the catalyst temperature reaches the minimum active temperature. Furthermore, the urea addition is stopped when the catalyst temperature becomes at least a predetermined upper limit temperature (for example, 400° C.) that is higher than the minimum active temperature. This is because even in this case, NOx cannot be efficiently reduced even with the urea addition. In fact, diesel engines generally have a lower exhaust temperature than gasoline engines, and the catalyst temperature relatively infrequently reaches such an upper limit temperature. Eventually, the urea addition is executed when the catalyst temperature is at least the minimum active temperature and lower than the upper limit temperature and is stopped outside this temperature zone.

Moreover, the ECU 100 indirectly detects the element temperature of the downstream NOx sensor 50 based on the element impedance of the downstream NOx sensor 50 to determine whether or not the detected element temperature is within a predetermined active zone. If the element temperature is within the active zone, the downstream NOx sensor 50 detects the NOx concentration (and the ammonia concentration). If the element temperature is outside the active zone, the downstream NOx sensor 50 avoids such detection.

In the present embodiment, the oxidation catalyst 30, the DPR catalyst 32, and the NOx catalyst 34 are arranged in this order from the upstream side. However, the arrangement order is not limited to this. The DPR catalyst 32 is a kind of diesel particulate filter (DPF) and thus has a filter structure. The DPR catalyst 32 is also of a continuous recycle type in which rare metal is provided on the surface of the filter and utilized to continuously oxidize (burn) particulate matter collected by the filter. The DPF is not limited to the DPR catalyst 32 but may be of any type. In other embodiments, at least one of the oxidation catalyst 30 and the DPR catalyst 32 may be omitted.

Now, the output calibration of the NOx sensor will be described.

Figure 2:
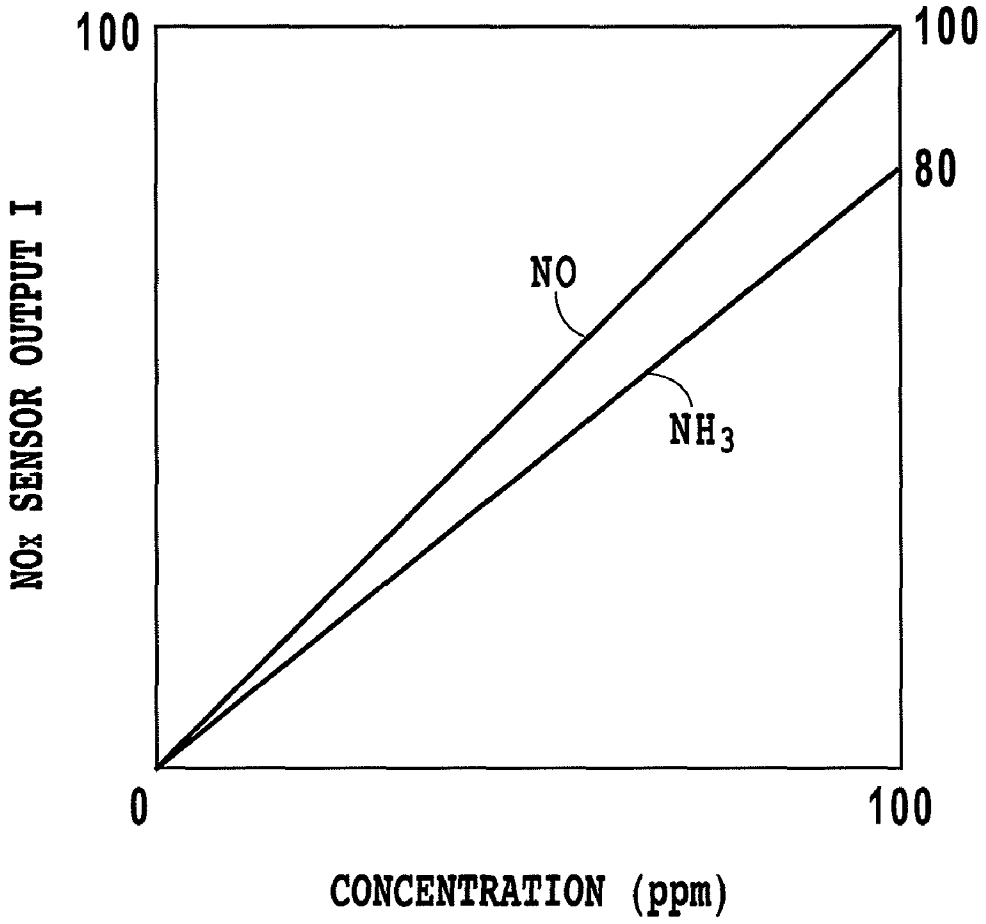
FIG. 2 is a graph showing the output characteristics of a downstream NOx sensor for an NOx concentration and an ammonia concentration.

First, the output characteristics of the downstream NOx sensor 50 for each concentration will be described. As shown in FIG. 2, the downstream NOx sensor 50 provides an output I that is proportional to the concentration of NOx or ammonia in exhaust gas. In FIG. 2, "NO" indicates the relationship between the NOx concentration and the sensor output I observed when the exhaust gas contains NOx but no ammonia and when NOx is composed of single gas NO. Furthermore, "$NH_3$" indicates the relationship between the ammonia concentration and the sensor output I observed when the exhaust gas contains ammonia but no NOx. As is appreciated from FIG. 2, at a concentration of 100 ppm, the sensor output I is 100 for NOx and only 80 for ammonia. Thus, the correlation between the downstream NOx sensor 50 and ammonia is 80%. Additionally, in terms of the gain defined by (sensor output)/(concentration), the gain is 100/100=1 for NOx and 80/100=0.8 for ammonia. Thus, the gain ratio of NOx to ammonia is 1/0.8=1.25.

Figure 3:
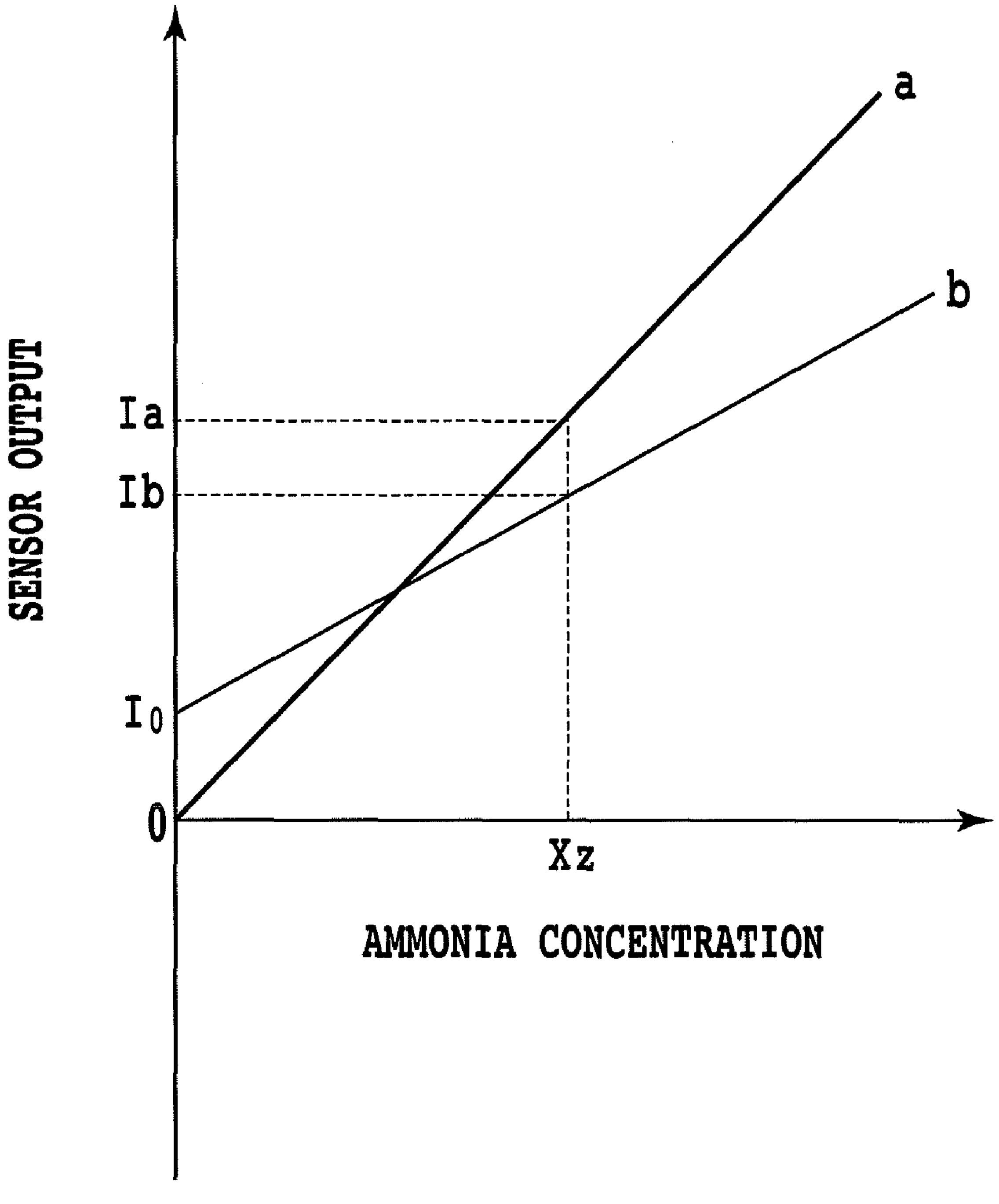
FIG. 3 is a schematic diagram illustrating the procedure of output calibration according to the present embodiment.

Now, the procedure of output calibration executed by the ECU 100 according to the present embodiment will be generally described. In FIG. 3, a thick line (a) shows that the downstream NOx sensor 50 is normal. A thin line (b) shows that both the offset and gain of the downstream NOx sensor 50 deviate from those in the normal state (this downstream NOx sensor 50 is hereinafter refereed to as the deviating sensor). In the illustrated example, the normal sensor provides a zero output when the ammonia concentration is zero and provides an output Ia at an ammonia concentration Xz. On the other hand, the deviating sensor provides an output $I_0$ larger than zero when the ammonia concentration is zero and provides an output Ib smaller than the output Ia at the ammonia concentration Xz.

When an output from the deviating sensor is calibrated, the sensor output $I_0$ obtained when the ammonia concentration is zero is stored in and learned by the ECU 100, which then calibrates the offset. Then, the gain is calculated by $(Ib-I_0)/(Yz-0)$ such that the sensor output rises from $I_0$ to Ib as the NOx concentration increases from zero to Yz. The value obtained is stored in or learned by the ECU 100, which then calibrates the gain. Thus, even for the deviating sensor, the correlation between the ammonia concentration and the sensor output or the correlation between the NOx concentration and the sensor output can be accurately and reliably determined.

The offset is calibrated during execution of fuel cut while the injection of fuel in the engine 10 is stopped. During this time, of course, the addition of urea via the urea addition valve 48 is also not performed. The gain is calibrated during execution of the fuel cut while the urea is added via the urea addition valve 48.

During the fuel cut, the exhaust gas (substantially air) supplied to the downstream NOx sensor 50 contains no NOx. Thus, the offset calibration during this time allows the offset to be accurately calibrated.

Furthermore, when an aqueous solution of urea is added via the urea addition valve 48 during execution of the fuel cut, the exhaust gas supplied to the downstream NOx sensor 50 contains no NOx but only ammonia obtained by hydrolysis of the aqueous solution of urea based on exhaust heat and catalytic heat. Thus, when a predetermined amount of aqueous solution of urea is added which is equivalent to a predetermined ammonia concentration, the appropriate correspondence relationship is established between the ammonia concentration and the sensor output. As a result, the gain can be suitably calibrated. In other words, ammonia gas of a known concentration is used as standard gas or span gas for calibration to calibrate the gain of the NOx sensor.

Figure 4:
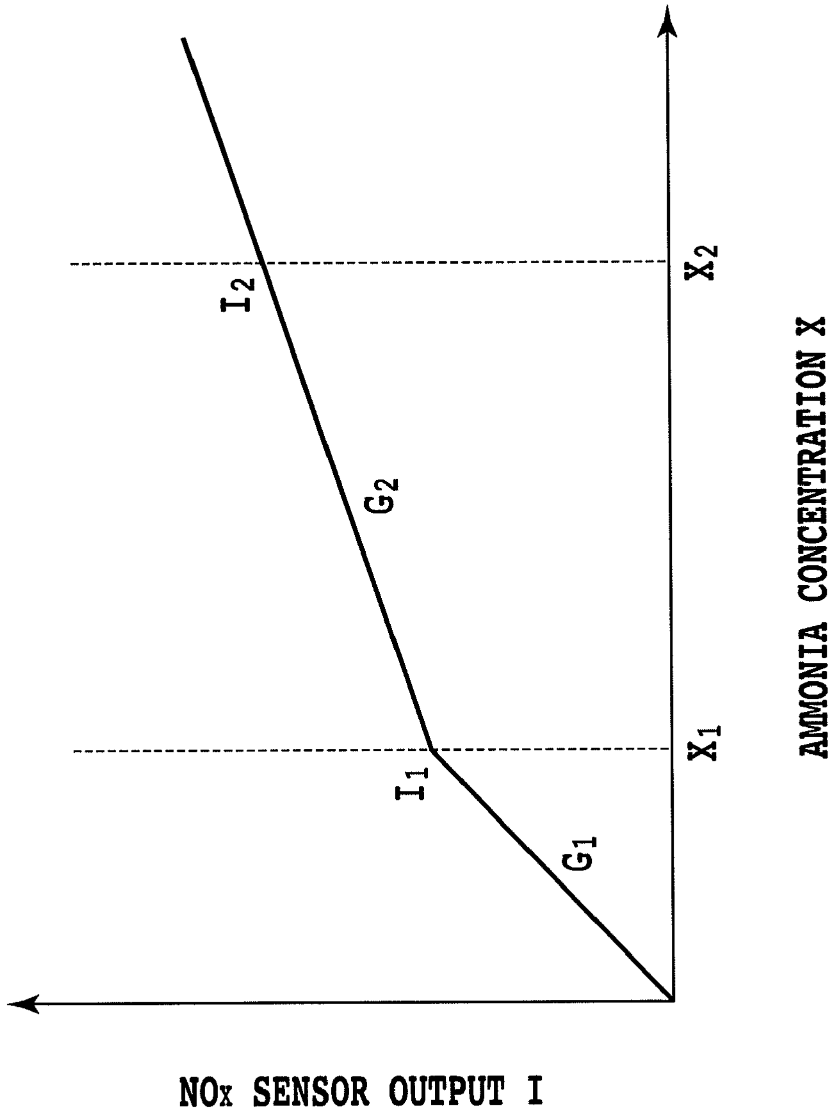
FIG. 4 is a schematic diagram illustrating gain calibration according to the present embodiment.

FIG. 4 is a schematic diagram specifically illustrating the gain calibration according to the present embodiment. As shown in FIG. 4, the offset has already been calibrated. Thus, the offset, that is, the sensor output obtained when the ammonia or NOx concentration is zero, has the correct value (in the illustrated example, the offset is zero for convenience). For example, when the fuel cut is executed for a vehicle speed reduction, amounts of aqueous solution of urea equivalent to predetermined two ammonia concentrations $X_1$ and $X_2$ are added via the urea addition valve 48. Here, in the present embodiment, the ammonia concentration X is pre-divided into a plurality of regions, and the gain is calibrated for each of the regions. Specifically, the ammonia concentration X is divided into two regions, that is, a low-concentration region in which $0 \leqq X \leqq X_1$ and a high-concentration region in which $X_1 < X$. The gain is calibrated using X=0 and $X_1$ for the low-concentration region and $X=X_1$ and $X_2$ ($X_1 < X_2$) for the high-concentration region. In the present embodiment, $X_1=100$ (ppm) and $X_2=500$ (ppm), but these values can be optionally set.

In particular, a growing demand for an emission reduction has recently led to a demand for an increase in the accuracy of detection of NOx in the low NOx-concentration region. Thus, when the ammonia concentration, correlated with the NOx concentration, is divided into the plurality of regions and the gain is calibrated for each of the regions, as described above, the gain can be accurately obtained for each region. This enables a drastic improvement in the accuracy with which NOx is detected in each region, particularly in the low-concentration region.

First, for the low-concentration region, during execution of the fuel cut, an amount of aqueous solution of urea equivalent to the ammonia concentration $X_1$ is added via the urea addition valve 48. A sensor output $I_1$ corresponding to the ammonia concentration $X_1$ is further acquired. Then, a gain $G_1$ for the low-concentration region is determined by $G_1=I_1/X_1$.

Then, for the high-concentration region, during execution of the fuel cut, an amount of aqueous solution of urea equivalent to the ammonia concentration $X_2$ is added via the urea addition valve 48. A sensor output $I_2$ corresponding to the ammonia concentration $X_2$ is further acquired. Then, a gain $G_2$ for the high-concentration region is determined by $G_2=(I_2-I_1)/(X_2-X_1)$.

Figure 5:
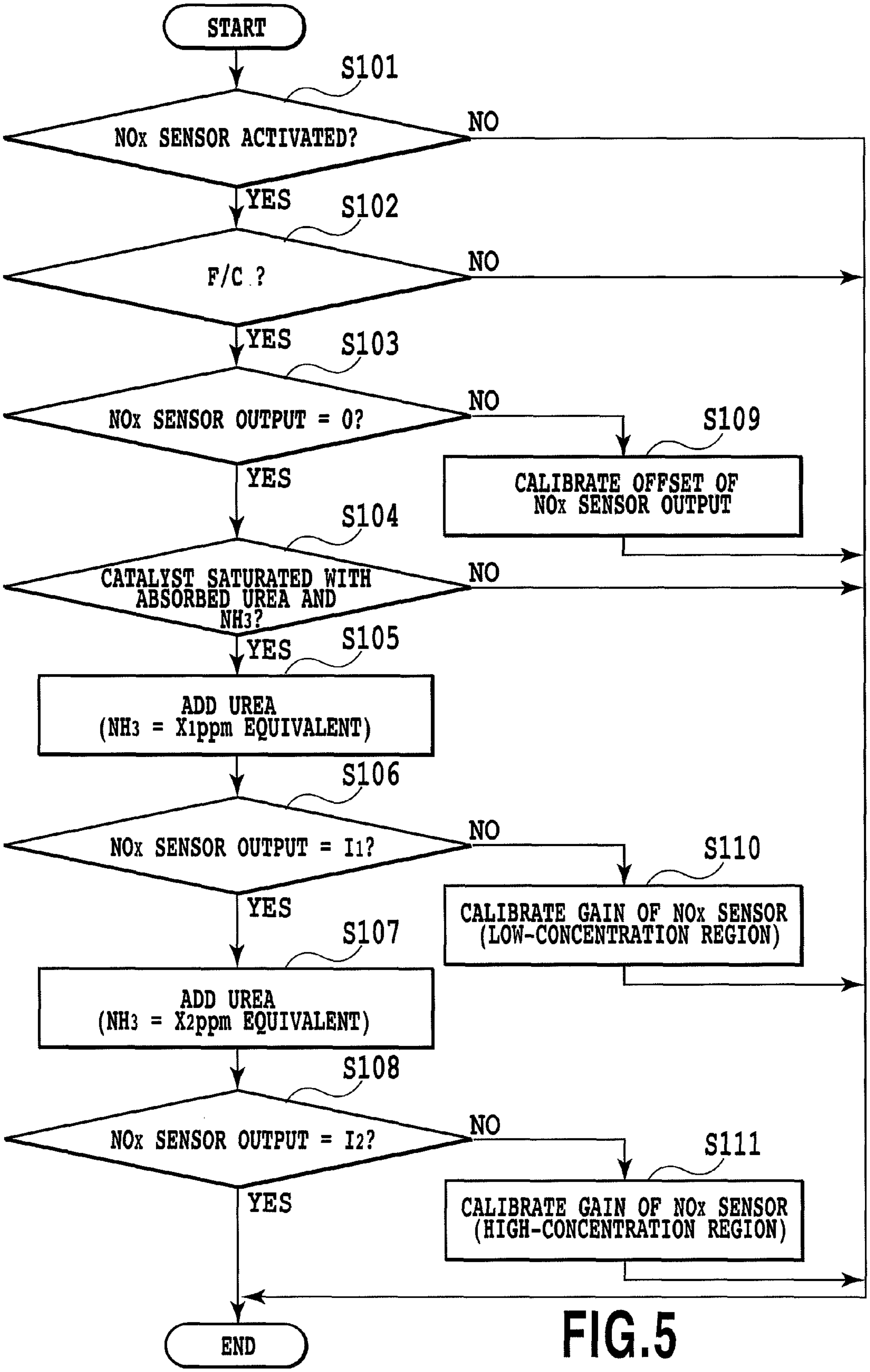
FIG. 5 is a flowchart of an output calibration process according to the present embodiment.

Now, a specific output calibration process will be described with reference to FIG. 5. An illustrated routine is repeatedly executed by the ECU 100 every predetermined time.

In the first step S101, the routine determines whether or not the downstream NOx sensor 50 is active. Upon determining that the downstream NOx sensor 50 is not active, the routine is terminated. On the other hand, upon determining that the downstream NOx sensor 50 is active, the routine determines in step S102 whether or not the fuel cut (F/C) is being executed for a speed reduction or the like. If the fuel cut is not being executed, the routine is terminated. On the other hand, if the fuel cut is being executed, the routine determines in step S103 whether or not the output I from the downstream NOx sensor 50 has a value equal to that obtained in the normal state, in the present embodiment, zero. In order to ensure an amount of time based on transportation delay from the beginning of the fuel cut until the arrival, at the downstream NOx sensor 50, of air serving as exhaust gas, the routine may determine whether or not the output I from the downstream NOx sensor 50 is zero, after a predetermined time from the beginning of the fuel cut.

If the output I from the downstream NOx sensor 50 is zero, the routine determines that the offset does not deviate, and proceeds to step S104. On the other hand, if the output I from the downstream NOx sensor 50 is not zero, the routine determines that the offset deviates, and proceeds to step S109 to calibrate the offset. Specifically, the actually acquired sensor output value $I_0$ is stored in or learned by the ECU 100 as a value (reference value) equivalent to an NOx concentration of zero.

In step S104, the routine determines whether or not the NOx catalyst 34 is saturated with the absorbed urea and ammonia. That is, the NOx catalyst 34 can absorb given amounts of urea and ammonia. If the NOx catalyst 34 is not saturated with the absorbed urea and ammonia, then even with addition of urea, ammonia is absorbed by the NOx catalyst 34. As a result, not a total amount of ammonia can be passed through the NOx catalyst 34. Thus, the present embodiment pre-checks whether or not the NOx catalyst 34 is saturated with the absorbed urea and ammonia. Then, after determining that the NOx catalyst 34 is saturated, the present embodiment adds a predetermined amount of urea. Thus, a total amount of ammonia obtained from the added urea can be passed through the NOx catalyst 34 and supplied to the downstream NOx sensor 50. Consequently, a predetermined concentration of ammonia gas can be supplied to the downstream NOx sensor 50, thus improving the accuracy of the gain calibration.

Whether or not the NOx sensor is saturated is determined as follows. First, the urea injection amount is accumulated during normal operation of the engine. Then, during step S104, the maximum urea absorption amount is determined based on the estimated catalyst temperature using a predetermined map or the like. The maximum urea absorption amount and the accumulated urea injection amount are compared with each other to determine whether or not the NOx catalyst is saturated with absorbed ammonia. If the NOx catalyst is saturated with absorbed ammonia, the routine proceeds to step S105. If the NOx catalyst is not saturated with absorbed ammonia, the routine is terminated. If the NOx catalyst is not saturated with absorbed ammonia, urea desirably continues to be added till the saturation is reached.

In step S105, a predetermined amount of aqueous solution of urea equivalent to the ammonia concentration $X_1$ is added via the urea addition valve 48. Thereafter, in step S106, the routine determines whether or not the actual output I from the downstream NOx sensor 50 is substantially equal to the predetermined output $I_1$ in the normal state which corresponds to the ammonia concentration $X_1$. Specifically, the routine determines whether or not the output I is such that $I_1-\alpha \leqq I \leqq I_1+\alpha$ ($\alpha$ is a very small value equal to or greater than 0).

If the actual output I is substantially equal to $I_1$, the routine determines that the gain does not deviate in the low-concentration region, to proceed to step S107. On the other hand, the actual output I is not substantially equal to $I_1$, the routine determines that the gain deviates in the low-concentration region. In step S110, the routine calibrates the gain in the low-concentration region. That is, the difference between the actual sensor output I and the reference value $I_0$ is divided by the ammonia concentration $X_1$ to calculate a calculated gain G1 for the low-concentration region ($G_1=(I-I_0)/X_1$). The calibrated gain $G_1$ is stored in or learned by the ECU 100.

Then, in step S107 and subsequent steps, the routine determines whether or not the gain deviates in the high-concentration region and executes a required gain calibration. First, in step S107, a predetermined amount of aqueous solution of urea equivalent to the ammonia concentration $X_2$ is added via the urea addition valve 48. Thereafter, the routine determines in step S108 whether or not the actual output I of the downstream NOx sensor 50 is substantially equal to the predetermined output $I_2$ in the normal state which corresponds to the ammonia concentration $X_2$. Specifically, the routine determines whether or not the output I is such that $I_2-\beta \leqq I \leqq I_2+\beta$ ($\beta$ is a very small value equal to or greater than 0).

If the actual output I is substantially equal to $I_2$, the routine determines that the gain does not deviate in the high-concentration region, and is terminated. On the other hand, if the actual output I is not substantially equal to $I_2$, the routine determines that the gain deviates in the high-concentration region. Thus, in step S111, the gain is calibrated in the high-concentration region. That is, the expression: $G_2=(I-I_1)/(X_2-X_1)$ is used to calculate the calibrated gain $G_2$ for the low-concentration region, which is then stored in or learned by the ECU 100.

The offset and gain of the downstream NOx sensor 50 have been calibrated. However, the values of the calibrated gains $G_1$ and $G_2$ have been obtained using ammonia gas as standard gas. Hence, to allow the output from the downstream NOx sensor 50 to be used as a value indicative of the NOx concentration, the values of the calibrated grains $G_1$ and $G_2$ need to be corrected utilizing such a correlation between ammonia and NOx as shown FIG. 2. Thus, according to the present embodiment, the ECU 100 performs the correction as follows.

As described above, the gain ratio of NOx to ammonia is 1/0.8=1.25. Hence, the calibrated gains $G_1$ and $G_2$ are multiplied by 1.25 to obtain gains $G_{1N}$ and $G_{2N}$ indicative of the relationship between the downstream NOx sensor output I and the NOx concentration ($G_{1N}=1.25G_1$, $G_{2N}=1.25G_2$). Furthermore, for the same sensor output, the ammonia concentrations $X_1$ and $X_2$ correspond to NOx concentrations $Y_1=0.8X_1$ and $Y_2=0.8X_2$. Thus, the downstream NOx sensor 50 detects the NOx concentration Y using the expression: $I=G_{1N}Y$ for the low-concentration region in which $0 \leqq Y \leqq Y_1$ and using the expression: $I=G_{2N}Y$ for the high-concentration region in which $Y_1 \leqq Y$.

In the present embodiment, the gain is set for each of the plurality of (two) concentration regions. However, as shown in FIG. 3, a single gain may be set for the entire concentration region. In this case, the urea addition, determination, and gain calibration (steps S107, S108, and S111) for the second point ($X_2$) in the above-described embodiment may be omitted. The concentration at the first point ($X_1$) is preferably set to a larger value.

Furthermore, in the present embodiment, the calibration is performed based on the relationship between the sensor output and the ammonia concentration. However, the calibration may be performed based on the relationship between the sensor output and the NOx concentration, utilizing the correlation between the ammonia concentration and the NOx concentration.

Now, another embodiment will be described. Components similar to those of the above-described embodiment are denoted by the same reference numerals in the drawings and will not be described below. Differences will be mainly described hereinafter.

Figure 6:
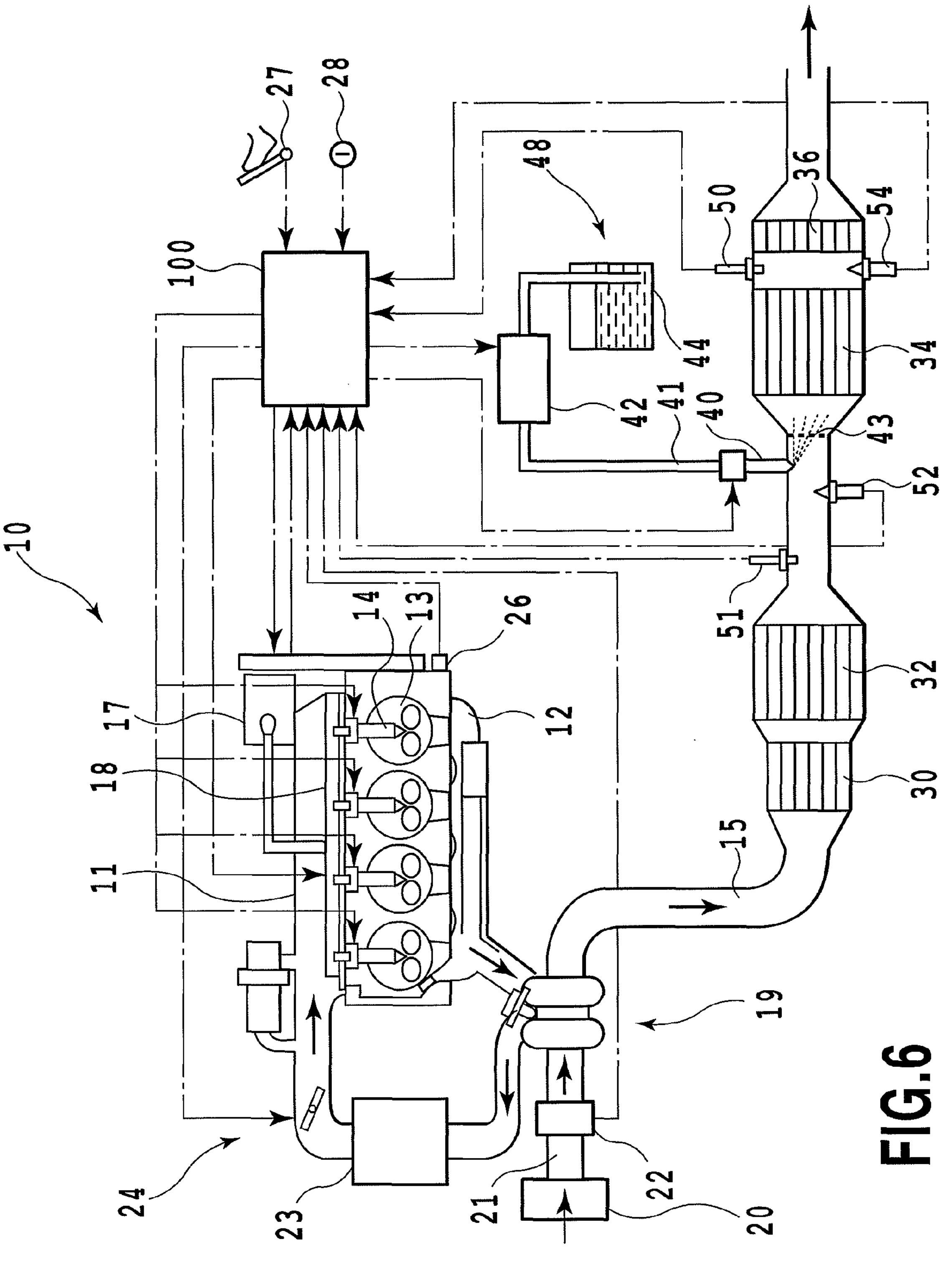
FIG. 6 is a schematic diagram of an internal combustion engine according to another embodiment of the present invention.

FIG. 6 is a diagram schematically showing the system of an internal combustion engine according to the present embodiment. The present embodiment is the same as the above-described one except that an upstream NOx sensor 51 that is another NOx sensor is provided upstream of the urea addition valve 48, particularly between the urea addition valve 48 and the DPR catalyst 32. In the present embodiment, the upstream NOx sensor 51 has the same configuration as that of the downstream NOx sensor 50.

In the present embodiment, at least after execution of the gain calibration of the downstream NOx sensor 50 and during non-execution of fuel cut and urea addition, an output (denoted by Iu) from the upstream NOx sensor 51 is compared with an output (denoted by Id) from the downstream NOx sensor in order to have the gain calibrated. That is, at least after the gain calibration of the downstream NOx sensor 50, preferably after the offset and gain calibrations of the downstream NOx sensor 50, the correlation between the output Id from the downstream NOx sensor 50 and the NOx concentration Y is accurate. Furthermore, during non-execution of fuel cut, NOx is present in the exhaust gas. During the non-execution of urea addition, NOx catalyst 34 does not reduce NOx, and the possible adverse effects of ammonia resulting from the urea are inhibited. Hence, exhaust gas with the same NOx concentration can be supplied to the upstream NOx sensor 51 and the downstream NOx sensor 50. Consequently, the upstream NOx sensor 51 and the downstream NOx sensor 50 are expected to provide equivalent outputs. Thus, the comparison of the two NOx sensors allows the gain of the upstream NOx sensor 51 to be calibrated.

In the present embodiment, first, the offset and gain the downstream NOx sensor 50 are calibrated in accordance with the technique described in the above-described embodiment. The offset calibration of the upstream NOx sensor 51 is executed simultaneously with the offset calibration of the downstream NOx sensor 50. During the offset calibration, fuel cut is executed to allow the same air to be supplied to the upstream NOx sensor 51 and the downstream NOx sensor 50. Thus, the same technique as that for the downstream NOx sensor 50 can be used to calibrate the offset of the upstream NOx sensor 51.

As described above, the offset and gain of the downstream NOx sensor 50 are calibrated, and the offset of the upstream NOx sensor 51 is calibrated. Subsequently, the engine is stopped, and when the engine is restarted, the gain of the upstream NOx sensor 51 is calibrated. The gain of the upstream NOx sensor 51 is calibrated while the NOx catalyst 34 is inactive and no urea is being added. This prevents the NOx in the exhaust gas from being reduced by the NOx catalyst 34 and also prevents the presence of ammonia caused by the urea addition. As a result, the upstream NOx sensor 51 and the downstream NOx sensor 50 can be supplied with exhaust gas with the same NOx concentration.

Figure 7:
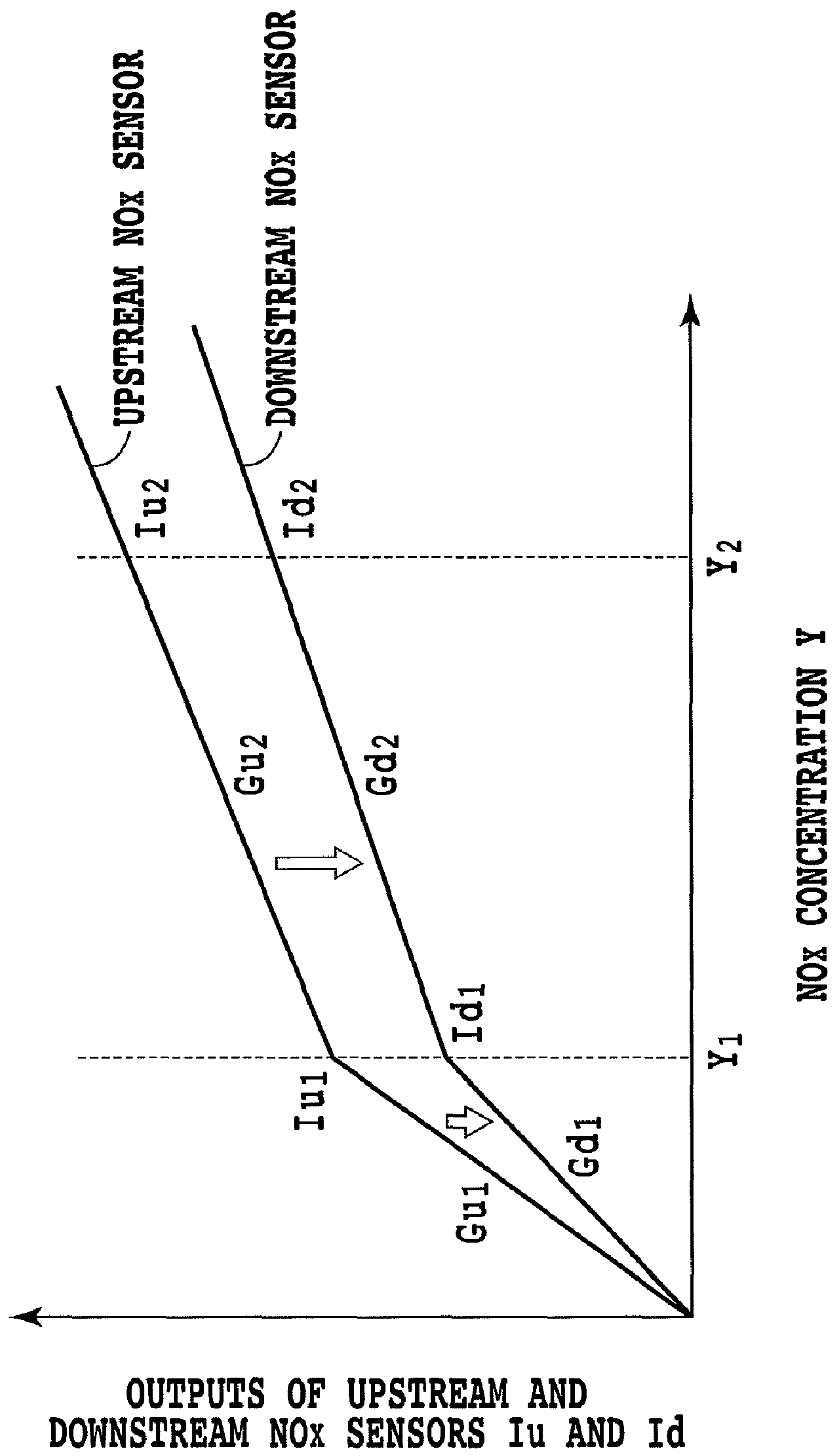
FIG. 7 is a schematic diagram illustrating gain calibration of an upstream NOx sensor.

FIG. 7 is a schematic diagram illustrating the gain calibration of the upstream NOx sensor 51. As shown in FIG. 7, the offset and gain of the downstream NOx sensor 50 have already been calibrated. Thus, the output from the downstream NOx sensor 50 for each NOx concentration is normal. In the illustrated example, the output from the downstream NOx sensor 50 is $Id_1$ when the NOx concentration is $Y_1$, and is $Id_2$ when the NOx concentration is $Y_2$. The gain is $Gd_1$ in the low-concentration region in which $0 \leqq Y \leqq Y_1$ and is $Gd_2$ in the high-concentration region in which $Y_1 < Y$.

On the other hand, the offset of the upstream NOx sensor 51 has already been calibrated and is thus normal. However, unlike in the case of the downstream NOx sensor 50, the gain of the upstream NOx sensor 51 deviates as shown in FIG. 7. In the illustrated example, the output from the upstream NOx sensor 51 is $Iu_1$ when the NOx concentration is $Y_1$, and is $Iu_2$ when the NOx concentration is $Y_2$. The gain is $Gu_1$ in the low-concentration region in which $0 \leqq Y \leqq Y_1$ and is $Gu_2$ in the high-concentration region in which $Y_1 < Y$. In this case, $Iu_1 > Id_1$, $Iu_2 > Id_2$, $Gu_1 > Gd_1$, and $Gu_2 > Gd_2$.

In the present embodiment, the gain is calibrated such that the output from the upstream NOx sensor 51 is equivalent to the output from the downstream NOx sensor 50 all over the NOx concentration region. Specifically, as shown by an arrow in FIG. 7, the gain is calculated such that in the low-concentration region, the gain $Gu_1$ of the upstream NOx sensor 51 is equal to the gain $Gd_1$ of the downstream NOx sensor 50 and that in the high-concentration region, the gain $Gu_2$ of the upstream NOx sensor 51 is equal to the gain $Gd_2$ of the downstream NOx sensor 50. Thus, the correlation between the output from the upstream NOx sensor 51 and the NOx concentration is equivalent to that between the output from the downstream NOx sensor 50 and the NOx concentration. As a result, the gain of the upstream NOx sensor 51 can be suitably calibrated.

Figure 8:
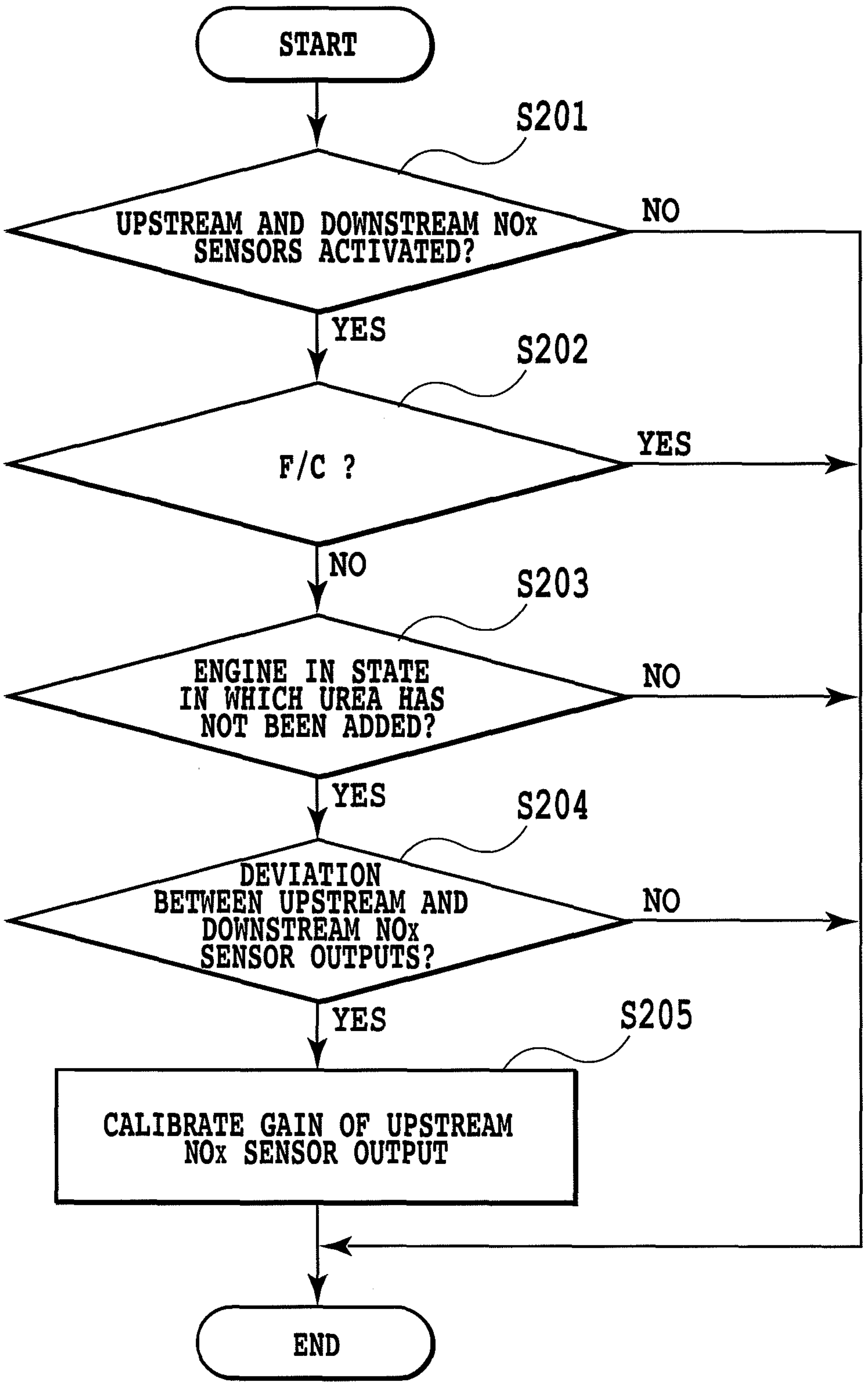
FIG. 8 is a flowchart of a gain calibration process for the upstream NOx sensor according to the embodiment shown in FIG. 6.

Now, the gain calibration process for the upstream NOx sensor 51 will be described with reference to FIG. 8. The illustrated routine is repeatedly executed by the ECU 100 every predetermined time.

First, the routine determines in step S201 whether or not the upstream NOx sensor 51 and the downstream NOx sensor 50 have been activated. If the upstream NOx sensor 51 and the downstream NOx sensor 50 have not been activated, the routine is terminated. On the other hand, upon determining that the upstream NOx sensor 51 and the downstream NOx sensor 50 have been activated, the routine determines in step S202 whether or not fuel cut is being executed. If fuel cut is being executed, the routine is terminated. On the other hand, if fuel cut is not being executed, the routine determines in step S203 whether or not the engine is in a state in which urea addition has not been started. That is, the routine determines whether or not the NOx catalyst 34 has been active and the engine is in the state in which urea addition has not been started.

If urea addition has already been started, the routine is terminated. On the other hand, if urea addition has not been started yet, the routine proceeds to step S204 to determine whether or not there is a deviation of at least a predetermined value between the upstream NOx sensor output Iu and the downstream NOx sensor output Id.

Upon determining that there is no deviation of at least the predetermined value, the routine is terminated. Upon determining that there is a deviation of at least the predetermined value, the routine executes such a gain calibration of the upstream NOx sensor 51 as described above in step S205.

In step S204, the routine can determine whether or not there is a deviation of at least a predetermined value by, for example, comparing the sensor outputs Iu and Id obtained at the time of execution of step S204. Alternatively, the routine may compare the sensor outputs Iu and Id in the low-concentration region with each other the sensor outputs Iu and Id in the low-concentration region with each other, and if there is a deviation of at least the predetermined value in one or both of the low- and high-concentration regions, determine that there is a deviation of the at least the predetermined value.

The embodiments of the present invention have been described. However, other embodiments of the present invention are possible. For example, the present invention is applicable to internal combustion engines other than the compression ignition internal combustion engines. The present invention is applicable to, for example, spark ignition internal combustion engines, particularly direct-injection lean burn gasoline engines.

The embodiment of the present invention is not limited to those described above. The present invention encompasses any variations, applications, and equivalents included in the concepts of the present invention defined by the claims. Thus, the present invention should not be interpreted in a limited manner but is applicable to any other techniques belonging to the scope of concepts of the present invention.

The invention claimed is:

1. An output calibration apparatus for an NOx sensor characterized by comprising:

a urea addition valve provided in an exhaust passage in an internal combustion engine to allow urea to be added to inside of the exhaust passage;

an NOx sensor provided at least downstream of the urea addition valve, the NOx sensor being capable of detecting not only an NOx concentration but also an ammonia concentration;

fuel cut means for executing fuel cut on the internal combustion engine; and calibration means for calibrating a gain of the NOx sensor based on ammonia obtained from the urea added via the urea addition valve during execution of the fuel cut.

2. The output calibration apparatus for the NOx sensor according to claim 1, characterized in that the calibration means calibrates the gain of the NOx sensor based on the relationship between an output from the NOx sensor and the ammonia concentration obtained when an amount of urea equivalent to a predetermined ammonia concentration is added via the urea addition valve during execution of the fuel cut.

3. The output calibration apparatus for the NOx sensor according to claim 1, characterized in that the calibration means calibrates an offset of the NOx sensor before execution of the gain calibration and during execution of the fuel cut.

4. The output calibration apparatus for the NOx sensor according to claim 1, characterized in that the calibration means calibrates the gain for each of a plurality of divided regions of the ammonia concentration or the NOx concentration.

5. The output calibration apparatus for the NOx sensor according to claim 1, characterized by further comprising an NOx sensor (upstream NOx sensor) provided upstream of the urea addition valve, and in that at least after execution of the calibration of the gain of the NOx sensor (downstream NOx sensor) provided downstream of the urea addition valve and during non-execution of the fuel cut and urea addition, the calibration means calibrates a gain of the upstream NOx sensor by comparing an output from the upstream NOx sensor with an output from the downstream NOx sensor.

6. A method for calibrating an output from an NOx sensor provided in an internal combustion engine, the internal combustion engine including a urea addition valve provided in an exhaust passage in the internal combustion engine to allow urea to be added to the exhaust passage, the NOx sensor being provided at least downstream of the urea addition valve and being capable of detecting not only an NOx concentration but also an ammonia concentration, the output calibration method for the NOx sensor comprising:

a step of executing fuel cut on the internal combustion engine;

a step of adding urea via the urea addition valve during execution of the fuel cut; and a step of calibrating a gain of the NOx sensor based on ammonia obtained from the added urea.

* * * * *